(12) United States Patent
Yamamoto et al.

(10) Patent No.: US 7,073,445 B2
(45) Date of Patent: Jul. 11, 2006

(54) ILLUMINATING DEVICE FOR A SCANNER, AND A PRINT READING APPARATUS USING THE SAME

(75) Inventors: Takaharu Yamamoto, Kyoto (JP); Masanori Nakayama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 92 days.

(21) Appl. No.: 10/891,104

(22) Filed: Jul. 15, 2004

(65) Prior Publication Data

US 2005/0024700 A1    Feb. 3, 2005

(30) Foreign Application Priority Data

Jul. 18, 2003    (JP)    ............................. 2003-198870

(51) Int. Cl.
*B41F 33/00*    (2006.01)

(52) U.S. Cl. ........................ 101/484; 101/483; 359/197
(58) Field of Classification Search ........ 101/483–485, 101/365; 359/396, 397
See application file for complete search history.

(56) References Cited

U.S. PATENT DOCUMENTS

| 6,539,863 B1 * | 4/2003 | Shiraishi ..................... 101/365 |
| 6,570,671 B1 * | 5/2003 | Yamaguchi et al. ....... 358/1.16 |
| 6,601,512 B1 | 8/2003 | Yamamoto et al. |
| 6,729,239 B1 * | 5/2004 | Edamitsu et al. ........... 101/485 |

FOREIGN PATENT DOCUMENTS

| JP | 56164362 A | * 12/1981 |
| JP | 2002-355950 | 12/2002 |

\* cited by examiner

*Primary Examiner*—Minh Chau
(74) *Attorney, Agent, or Firm*—McDermott Will & Emery LLP

(57) ABSTRACT

An illuminating unit includes a pair of fluorescent lamps each having a prism sheet mounted peripherally thereof to act as a condensing member, and concave mirrors for reflecting light emitted from the fluorescent lamps to printing paper acting as a print. The prism sheet acts as a condensing member for condensing the light diffused axially of each fluorescent lamp, in directions perpendicular to the axis of the fluorescent lamp. The prism sheet has minute projections approximately in the shape of triangular prisms formed on a surface thereof continually along the axis of the fluorescent lamp and projecting in the directions perpendicular to the axis of the fluorescent lamp.

7 Claims, 16 Drawing Sheets

ILLUMINATING DEVICE FOR A SCANNER, AND A PRINT READING APPARATUS USING THE SAME

BACKGROUND OF THE INVENTION

1. Field of the Invention

This invention relates to an illuminating device for a scanner, and to a print reading apparatus.

2. Description of the Related Art

A print reading apparatus is used, for example, to control the feed rate of ink and the feed rate of dampening water in a printing press based on image data of prints, and to inspect printed images. The print reading apparatus is the scan type that moves a print relative to an illuminating device and an image pickup device, and reads images from the print through the image pickup device while illuminating the print with the illuminating device (see Japanese Unexamined Patent Publication 2002-355950, for example).

Such a scan type print reading apparatus uses light sources in the form of long tubes such as fluorescent lamps. In order to use efficiently the light emitted from the light sources in the form of long tubes, the illuminating device includes reflectors such as concave mirrors disposed at the back of the light sources.

The illuminating device used in such a print reading apparatus is required to illuminate a print with a linearly uniform light of high illuminance. In the conventional illuminating device, the reflectors condense the light in directions perpendicular to the axes of the tubular light sources. However, little or no consideration has been made as to a condensation of light axially of the tubular light sources. Thus, where the tubular light sources such as fluorescent lamps are used, illuminance is high in a region corresponding to a middle portion longitudinally of each light source, and low in regions corresponding to opposite ends thereof

SUMMARY OF THE INVENTION

The object of this invention, therefore, is to provide an illuminating device for a scanner, and a print reading apparatus, capable of emitting light of high illuminance and uniform axially of light sources in the form of long tubes.

The above object is fulfilled, according to this invention, by an illuminating device for a scanner, comprising light sources extending axially thereof, and condensing members each disposed between one of the light sources and an illuminated object for condensing light diffused axially of the light source, in directions substantially perpendicular to an axis of the light source.

This illuminating device for a scanner can emit light of high illuminance and uniform axially of the light sources.

Each of the condensing members may have minute projections approximately in a shape of triangular prisms formed on a surface thereof continually along the axis of the light source and projecting in directions substantially perpendicular to the axis of one of the light sources.

The light sources may comprise tubular light sources, and each of the condensing members may comprise a resin sheet mounted peripherally of one of the light sources.

In another aspect of this invention, there is provided a print reading apparatus having an illuminating unit, an image pickup unit, and a moving mechanism for moving a print relative to the illuminating unit and the image pickup unit, for scanning the print with the illuminating unit and the image pickup unit to read an image from the print, the illuminating unit comprising light sources extending axially thereof, and condensing members each disposed between one of the light sources and an illuminated object for condensing light diffused axially of the light source, in directions substantially perpendicular to an axis of the light source.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

An embodiment of this invention will be described hereinafter with reference to the drawings.

[Construction of Offset Press]

Figure 1:
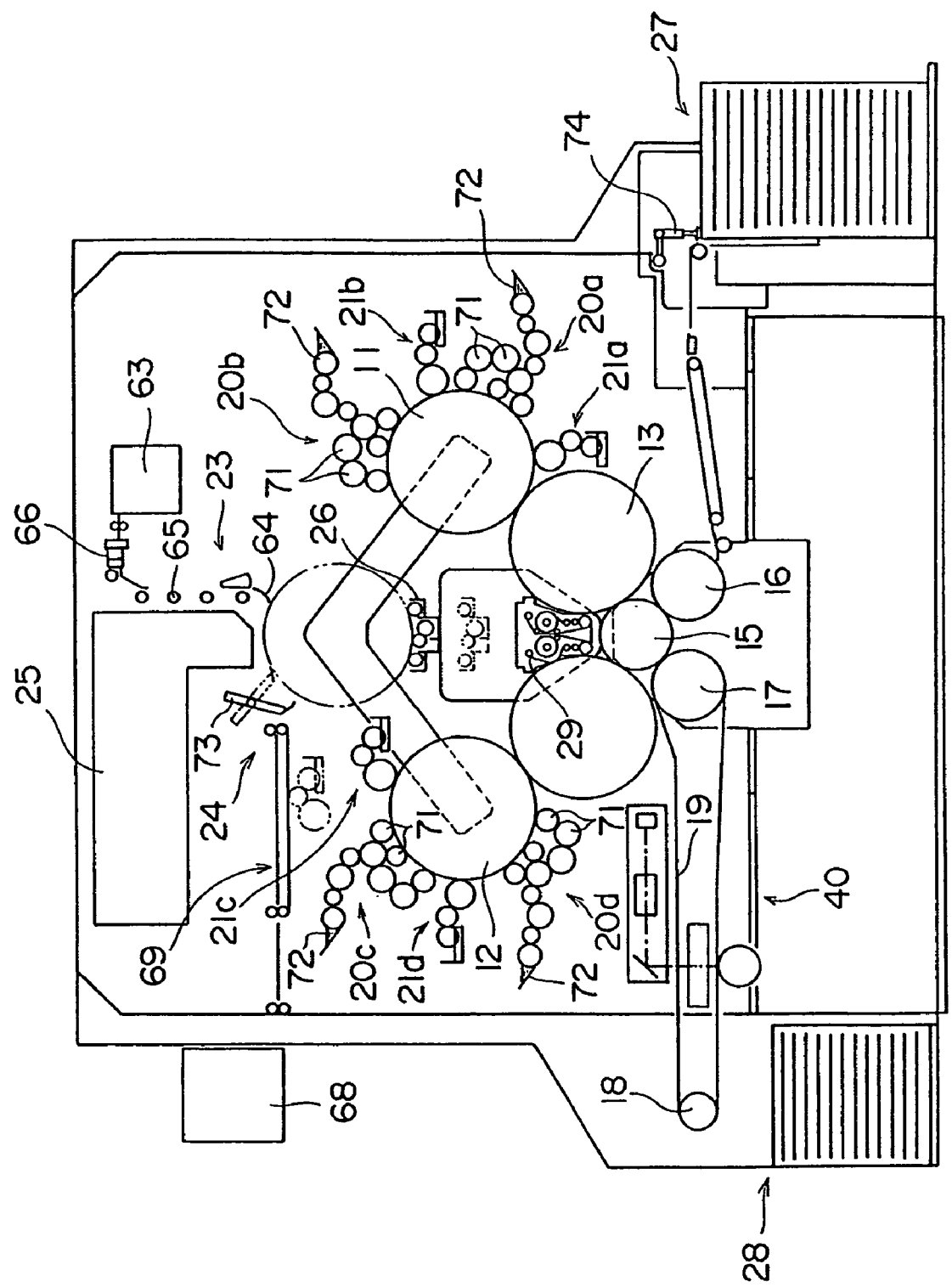
FIG. 1 is a schematic side view of an offset press employing a print reading apparatus according to the invention.

An offset press employing a print reading apparatus according to the invention will be described first. FIG. 1 is a schematic side view of the offset press employing a print reading apparatus according to the invention.

This offset press records images on blank plates mounted on first and second plate cylinders 11 and 12, feeds inks to the plates having the images recorded thereon, and transfers the inks from the plates through first and second blanket cylinders 13 and 14 to printing paper held on an impression cylinder 15, thereby printing the images on the printing paper.

The first plate cylinder 11 is movable between a first printing position shown in a solid line and an image recording position shown in a two-dot chain line in FIG. 1. The second plate cylinder 12 is movable between a second printing position shown in a solid line in FIG. 1 and the same image recording position.

Around the first plate cylinder 11 in the first printing position are an ink feeder 20a for feeding an ink of black (K), for example, to the plate, an ink feeder 20b for feeding an ink of magenta (M), for example, to the plate, and dampening water feeders 21a and 21b for feeding dampening water to the plate. Around the second plate cylinder 12 in the second printing position are an ink feeder 20c for feeding an ink of cyan (C), for example, to the plate, an ink feeder 20d for feeding an ink of yellow (Y), for example, to the plate, and dampening water feeders 21c and 21d for feeding dampening water to the plate. Further, around the first or second plate cylinder 11 or 12 in the image recording position are a plate feeder 23, a plate remover 24, an image recorder 25 and a developing device 26.

The first blanket cylinder 13 is contactable with the first plate cylinder 11, while the second blanket cylinder 14 is contactable with the second plate cylinder 12. The impression cylinder 15 is contactable with the first and second blanket cylinders 13 and 14 in different positions. The apparatus further includes a paper feed cylinder 16 for transferring printing paper supplied from a paper storage 27 to the impression cylinder 15, a paper discharge cylinder 17 with chains 19 wound thereon for discharging printed paper from the impression cylinder 15 to a paper discharge station 28, a print reading apparatus 40 according to this invention for measuring densities of detecting patches printed on the printing paper, and a blanket cleaning unit 29.

Each of the first and second plate cylinders 11 and 12 is coupled to a plate cylinder moving mechanism not shown, and driven by this moving mechanism to reciprocate between the first or second printing position and the image recording position. In the first printing position, the first plate cylinder 11 is driven by a motor not shown to rotate synchronously with the first blanket cylinder 13. In the second printing position, the second plate cylinder 12 is rotatable synchronously with the second blanket cylinder 14. Adjacent the image recording position is a plate cylinder rotating mechanism, not shown, for rotating the first or second plate cylinder 11 or 12 whichever is in the image recording position.

The plate feeder 23 and plate remover 24 are arranged around the first or second plate cylinder 11 or 12 in the image recording position.

The plate feeder 23 includes a supply cassette 63 storing a roll of elongate blank plate in light-shielded state, a guide member 64 and guide rollers 65 for guiding a forward end of the plate drawn from the cassette 63 to the surface of the first or second plate cylinder 11 or 12, and a cutter 66 for cutting the elongate plate into sheet plates. Each of the first and second plate cylinders 11 and 12 has a pair of clamps, not shown, for clamping the forward and rear ends of the plate fed from the plate feeder 23.

The plate remover 24 has a blade mechanism 73 for separating a plate from the first or second plate cylinder 11 or 12 after a printing operation, a discharge cassette 68, and a conveyor mechanism 69 for transporting the plate separated by the blade mechanism 73 to the discharge cassette 68.

The forward end of the plate drawn from the feeder cassette 63 is guided by the guide rollers 65 and guide member 64, and gripped by one of the clamps on the first or second plate cylinder 11 or 12. Then, the first or second plate cylinder 11 or 12 is rotated by the plate cylinder rotating mechanism not shown, whereby the plate is wrapped around the first or second plate cylinder 11 or 12. The rear end of the plate cut by the cutter 66 is clamped by the other clamp. While, in this state, the first or second plate cylinder 11 or 12 is rotated at low speed, the image recorder 25 irradiates the surface of the plate mounted peripherally of the first or second plate cylinder 11 or 12 with a modulated laser beam for recording images thereon.

Figure 2A:
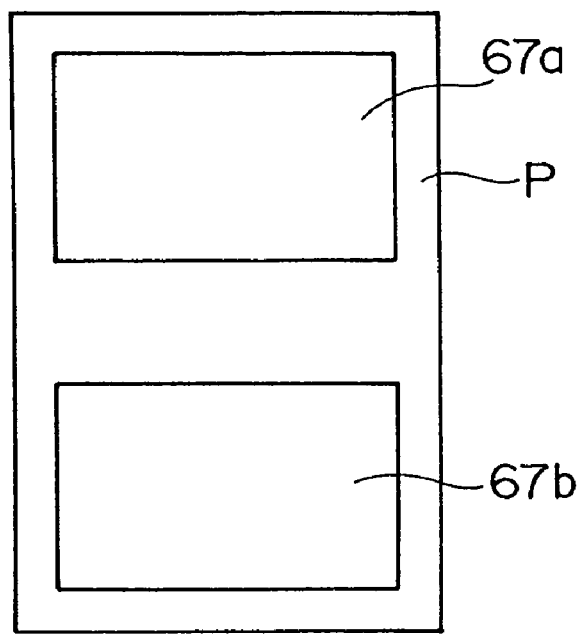
FIG. 2A is an explanatory view showing an arrangement of image areas on a printing plate.
Figure 2B:
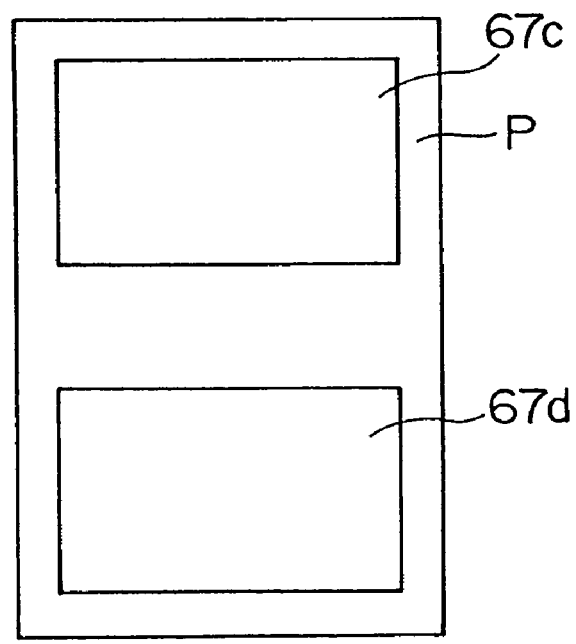
FIG. 2B is an explanatory view showing an arrangement of image areas on another printing plate.

On the plate P mounted peripherally of the first plate cylinder 11, the image recorder 25, as shown in FIG. 2A, records an image area 67a to be printed with black ink, and an image area 67b to be printed with magenta ink. On the plate P mounted peripherally of the second plate cylinder 12, the image recorder 25, as shown in FIG. 2B, records an image area 67c to be printed with cyan ink, and an image area 67d to be printed with yellow ink. The image areas 67a and 67b are recorded in evenly separated positions, i.e. in positions separated from each other by 180 degrees, on the plate P mounted peripherally of the first plate cylinder 11. Similarly, the image areas 67c and 67d are recorded in evenly separated positions, i.e. in positions separated from each other by 180 degrees, on the plate P mounted peripherally of the second plate cylinder 12.

Referring again to FIG. 1, the ink feeders 20a and 20b are arranged around the first plate cylinder 11 in the first printing position, while the ink feeders 20c and 20d are arranged around the second plate cylinder 12 in the second printing position, as described hereinbefore. Each of these ink feeders 20a, 20b, 20c and 20d (which may be referred to collectively as "ink feeders 20") includes a plurality of ink rollers 71 and an ink source 72.

The ink rollers 71 of the ink feeders 20a and 20b are swingable by action of cams or the like not shown. With the swinging movement, the ink rollers 71 of the ink feeder 20a or 20b come into contact with one of the two image areas 67a and 67b formed on the plate P mounted peripherally of the first plate cylinder 11. Thus, the ink is fed only to an intended one of the image areas 67a and 67b. Similarly, the ink rollers 71 of the ink feeders 20c and 20d are swingable by action of cams or the like not shown. With the swinging movement, the ink rollers 71 of the ink feeder 20c or 20d come into contact with one of the two image areas 67c and 67d formed on the plate P mounted peripherally of the second plate cylinder 12. Thus, the ink is fed only to an intended one of the image areas 67c and 67d.

Figure 3:
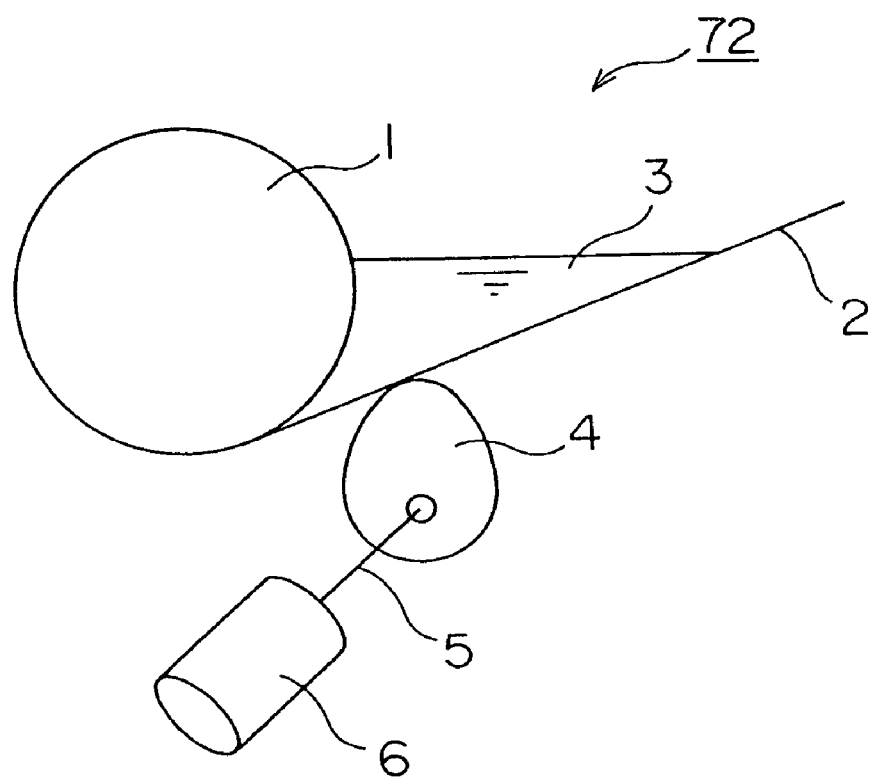
FIG. 3 is a schematic side view of an ink source.
Figure 4:
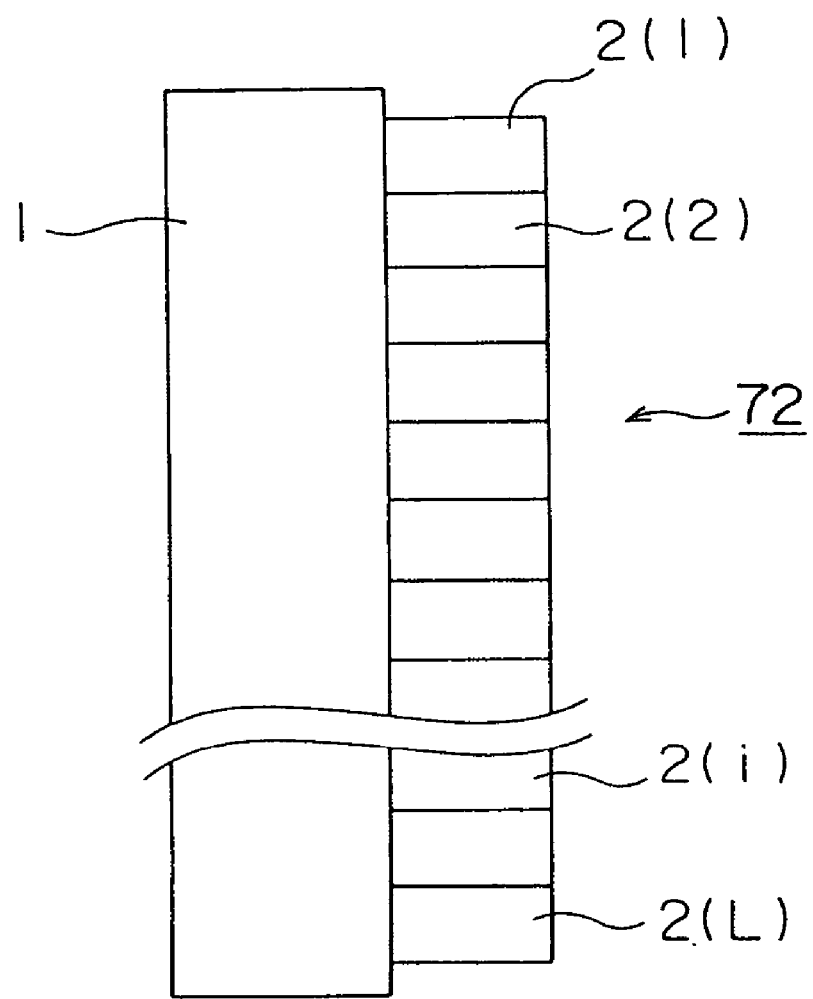
FIG. 4 is a plan view of the ink source.

FIG. 3 is a schematic side view of the ink source 72 noted above. FIG. 4 is a plan view thereof. Ink 3 is omitted from FIG. 4.

The ink source 72 includes an ink fountain roller 1 having an axis thereof extending in a direction of width of printed matter (i.e. perpendicular to a printing direction of the offset press), and ink keys 2 (1), 2 (2) . . . 2 (L) arranged in the direction of width of the printed matter. In this specification, these ink keys may be collectively called "ink keys 2". The ink keys 2 correspond in number to the number L of areas divided in the direction of width of the printed matter. Each of the ink keys 2 has an adjustable opening degree with respect to the outer periphery of the ink fountain roller 1. The ink fountain roller 1 and ink keys 2 define an ink well for storing ink 3.

Eccentric cams 4, L in number, are arranged under the respective ink keys 2 for pressing the ink keys 2 toward the surface of ink fountain roller 1 to vary the opening degree of each ink key 2 with respect to the ink fountain roller 1. The eccentric cams 4 are connected through shafts 5 to pulse motors 6, L in number, for rotating the eccentric cams 4, respectively.

Each pulse motor 6, in response to an ink key drive pulse applied thereto, rotates the eccentric cam 4 about the shaft 5 to vary a pressure applied to the ink key 2. The opening degree of the ink key 2 with respect to the ink fountain roller 1 is thereby varied to vary the rate of ink fed to the printing plate.

Referring again to FIG. 1, the dampening water feeders 21*a*, 21*b*, 21*c* and 21*d* (which may be referred to collectively as "dampening water feeders 21") feed dampening water to the plates P before the ink feeders 20 feed the inks thereto. Of the dampening water feeders 21, the water feeder 21*a* feeds dampening water to the image area 67*a* on the plate P, the water feeder 21*b* feeds dampening water to the image area 67*b* on the plate P, the water feeder 21*c* feeds dampening water to the image area 67*c* on the plate P, and the water feeder 21*d* feeds dampening water to the image area 67*d* on the plate P.

Figure 5:
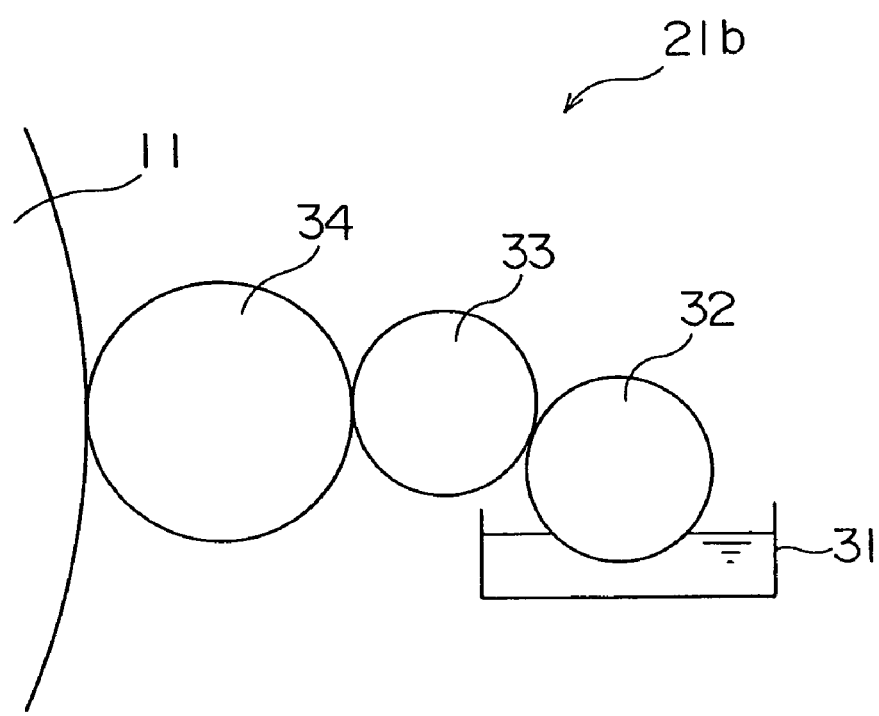
FIG. 5 is a schematic side view of a dampening water feeder.

FIG. 5 is a schematic side view of the dampening water feeder 21*b*.

The dampening water feeder 21*b* includes a water source having a water vessel 31 for storing dampening water and a water fountain roller 32 rotatable by a motor, not shown, and two water rollers 33 and 34 for transferring dampening water from the fountain roller 32 to the surface of the plate mounted peripherally of the first plate cylinder 11. This dampening water feeder is capable of adjusting the rate of feeding dampening water to the surface of the plate by varying the rotating rate of fountain roller 32.

The three other water feeders 21*a*, 21*c* and 21*d* have the same construction as the water feeder 21*b*.

Referring again to FIG. 1, the developing device 26 is disposed under the first plate cylinder 11 or second plate cylinder 12 in the image recording position. This developing device 26 includes a developing unit, a fixing unit and a squeezing unit, which are vertically movable between a standby position shown in two-dot chain lines and a developing position shown in solid lines in FIG. 1.

In developing the images recorded on the plate P by the image recorder 25, the developing unit, fixing unit and squeezing unit are successively brought into contact with the plate P rotated with the first or second plate cylinder 11 or 12.

The first and second blanket cylinders 13 and 14 movable into contact with the first and second plate cylinders 11 and 12 have the same diameter as the first and second plate cylinders 11 and 12, and have ink transfer blankets mounted peripherally thereof. Each of the first and second blanket cylinders 13 and 14 is movable into and out of contact with the first or second plate cylinder 11 or 12 and the impression cylinder 15 by a contact mechanism not shown.

The blanket cleaning unit 29 disposed between the first and second blanket cylinders 13 and 14 cleans the surfaces of the first and second blanket cylinders 13 and 14 by feeding a cleaning solution to an elongate cleaning cloth extending from a delivery roll to a take-up roll through a plurality of pressure rollers, and sliding the cleaning cloth in contact with the first and second blanket cylinders 13 and 14.

The impression cylinder 15 contactable by the first and second blanket cylinders 13 and 14 has half the diameter of the first and second plate cylinders 11 and 12 and the first and second blanket cylinders 13 and 14, as noted hereinbefore. Further, the impression cylinder 15 has a gripper, not shown, for holding and transporting the forward end of printing paper.

The paper feed cylinder 16 disposed adjacent the impression cylinder 15 has the same diameter as the impression cylinder 15. The paper feed cylinder 16 has a gripper, not shown, for holding and transporting the forward end of each sheet of printing paper fed from the paper storage 27 by a reciprocating suction board 74. When the printing paper is transferred from the feed cylinder 16 to the impression cylinder 15, the gripper of the impression cylinder 15 holds the forward end of the printing paper which has been held by the gripper of the feed cylinder 16.

The paper discharge cylinder 17 disposed adjacent the impression cylinder 15 has the same diameter as the impression cylinder 15. The discharge cylinder 17 has a pair of chains 19 wound around opposite ends thereof. The chains 19 are interconnected by coupling members, not shown, having a plurality of grippers 41 arranged thereon. When the impression cylinder 15 transfers the printing paper to the discharge cylinder 17, one of the grippers 41 of the discharge cylinder 17 holds the forward end of the printing paper having been held by the gripper of the impression cylinder 15. With movement of the chains 19, densities of the detecting patches printed on the printing paper are measured by the print reading apparatus 40. Thereafter the printing paper is transported to the paper discharge station 28 to be discharged thereon.

The paper feed cylinder 16 is connected to a drive motor through a belt not shown. The paper feed cylinder 16, impression cylinder 15, paper discharge cylinder 17 and the first and second blanket cylinders 13 and 14 are coupled to one another by gears mounted on end portions thereof, respectively. Further, the first and second blanket cylinders 13 and 14 are coupled to the first and second plate cylinders 11 and 12 in the first and second printing positions, respectively, by gears mounted on end portions thereof. Thus, a motor, not shown, is operable to rotate the paper feed cylinder 16, impression cylinder 15, paper discharge cylinder 17, the first and second blanket cylinders 13 and 14 and the first and second plate cylinders 11 and 12 synchronously with one another.

Figure 6:
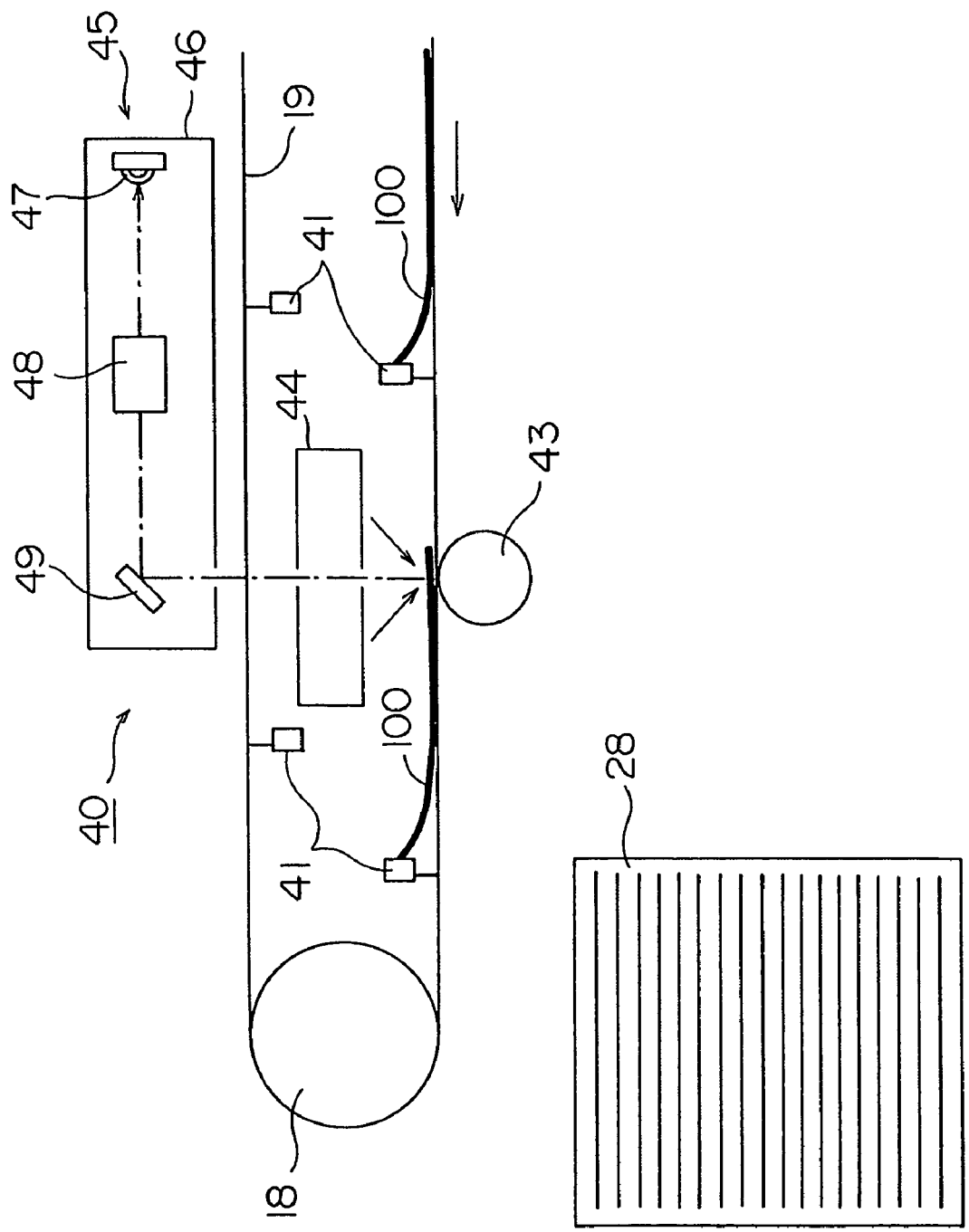
FIG. 6 is a schematic side view of the image reading apparatus.

FIG. 6 is a schematic side view of the print reading apparatus 40 for measuring densities of the detecting patches printed on the printing paper.

The pair of chains 19 are endlessly wound around the opposite ends of the paper discharge cylinder 17 shown in FIG. 1 and a pair of large sprockets 18. As noted hereinbefore, the chains 19 are interconnected by coupling members, not shown, having a plurality of grippers 41 arranged thereon each for gripping a forward end of printing paper 100 transported.

The pair of chains 19 have a length corresponding to a multiple of the circumference of paper discharge cylinder 17. The grippers 41 are arranged on the chains 19 at intervals each corresponding to the circumference of paper discharge cylinder 17. Each gripper 41 is opened and closed by a cam mechanism, not shown, synchronously with the gripper on the paper discharge cylinder 7. Thus, each gripper 41 receives printing paper 100 from the paper discharge cylinder 7, transports the printing paper 100 with rotation of the chains 19, and discharges the paper 100 to the paper discharge station 28.

The printing paper 100 is transported with only the forward end thereof held by one of the grippers 41, the rear end of printing paper 100 not being fixed. Consequently, the printing paper 100 could flap during transport, which impairs an operation, to be described hereinafter, of the print reading apparatus 40 to measure densities of the detecting patches. To avoid such an inconvenience, this offset press provides a suction roller 43 disposed upstream of the paper discharge station 28 for stabilizing the printing paper 100 transported.

The suction roller 43 is in the form of a hollow roller having a surface defining minute suction bores, with the hollow interior thereof connected to a vacuum pump not shown. The suction roller 43 is disposed to have an axis thereof extending parallel to the grippers 41 bridging the pair of chains 19, a top portion of the suction roller 43 being substantially at the same height as a lower run of the chains 19.

The suction roller 43 is driven to rotate or freely rotatable in a matching relationship with a moving speed of the grippers 41. Thus, the printing paper 100 is drawn to the surface of the suction roller 43, thereby being held against flapping when passing over the suction roller 43. In place of the suction roller 43, a suction plate may be used to suck the printing paper 100 two-dimensionally.

The print reading apparatus 40 according to this invention includes an illuminating unit 44 for illuminating the printing paper 100 transported as a print, and an image pickup unit 45 for picking up images of the detecting patches on the printing paper 100 illuminated by the illuminating unit 44 and measuring densities of the patches. The mechanism for moving the printing paper 100, including the pair of chains 19, also forms part of the print reading apparatus 40 according to this invention. The illuminating unit 44 is disposed between the upper and lower runs of chains 19 to extend along the suction roller 43, and has a plurality of linear light sources for illuminating the printing paper 100 over the suction roller 43.

The construction of the illuminating unit 44 characterizing this invention will be described in detail hereinafter.

The image pickup unit 45 includes a light-shielding and dustproof case 46, and a mirror 49, a lens 48 and a CCD line sensor 47 arranged inside the case 46. The image pickup unit 45 picks up the image of printing paper 100 over the suction roller 43 through slits of the illuminating unit 44. Incident light of the image reflected by the mirror 49 passes through the lens 48 to be received by the CCD line sensor 47.

Figure 7:
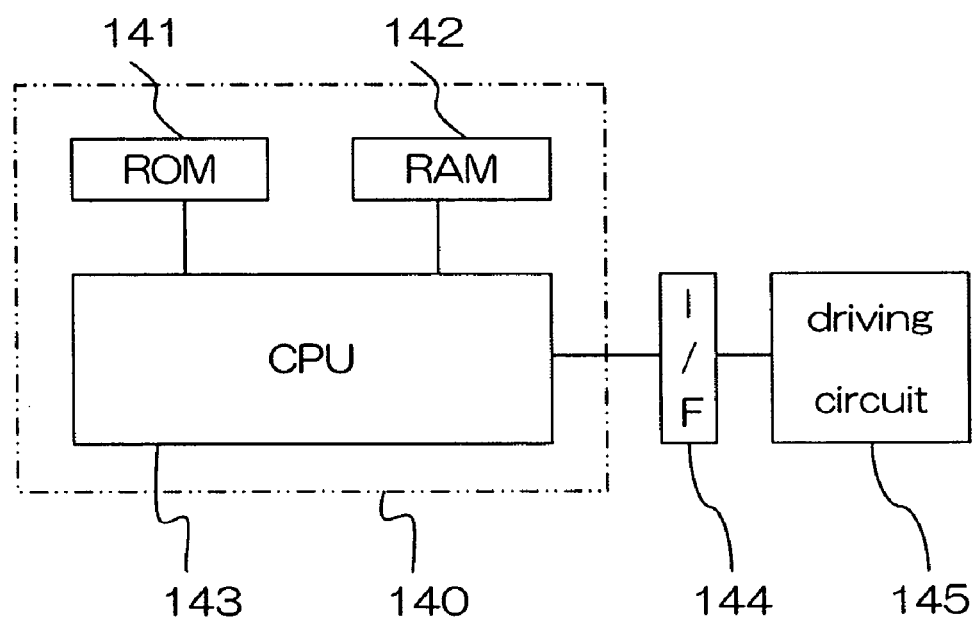
FIG. 7 is a block diagram of a principal electrical structure of the offset press.

FIG. 7 is a block diagram showing a principal electrical structure of the offset press. This offset press includes a control unit 140 having a ROM 141 for storing operating programs necessary for controlling the apparatus, a RAM 142 for temporarily storing data and the like during a control operation, and a CPU 143 for performing logic operations. The control unit 140 has a driving circuit 145 connected thereto through an interface 144, for generating driving signals for driving the ink feeders 20, dampening water feeders 21, image recorder 25, developing device 26, blanket cleaning unit 29, print reading apparatus 40, the contact mechanisms for the first and second blanket cylinders 13 and 14, and so on. The offset press is controlled by the control unit 140 to execute prepress and printing operations as described hereinafter.

[Printing Operation]

Figure 8:
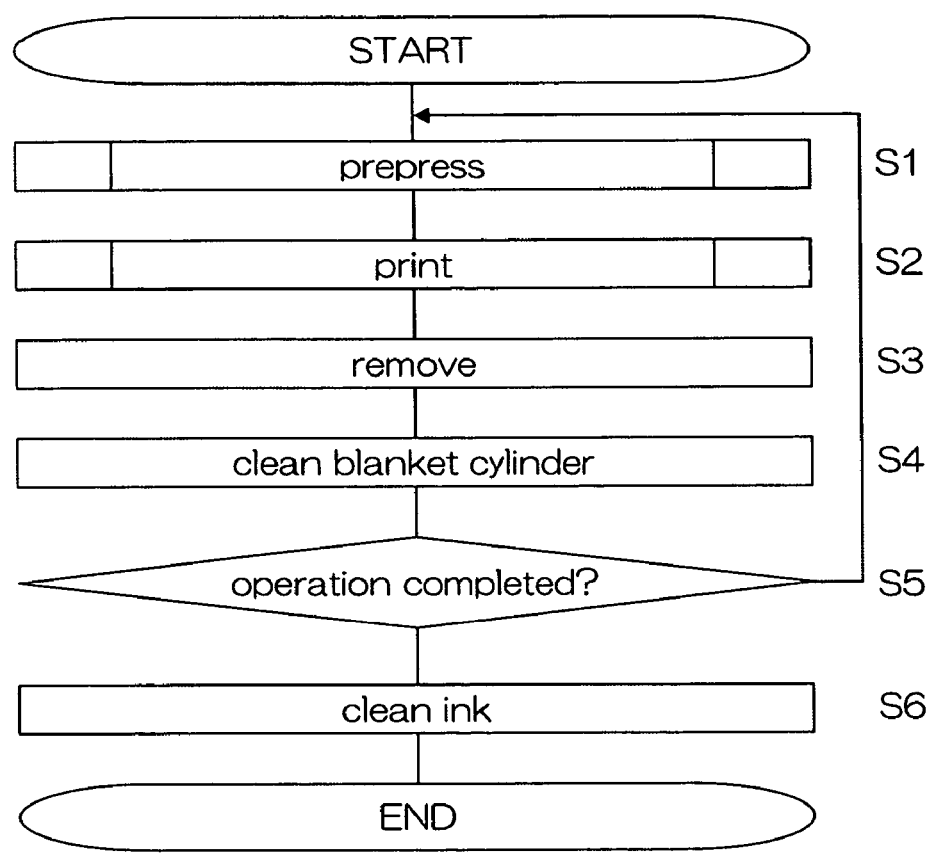
FIG. 8 is a flow chart of prepress and printing operations of the offset press.

The prepress and printing operations of the offset press will be described next. FIG. 8 is a flow chart showing an outline of the prepress and printing operations of the offset press. These prepress and printing operations are directed to multicolor printing of printing paper with the four color inks of yellow, magenta, cyan and black.

Figure 9:
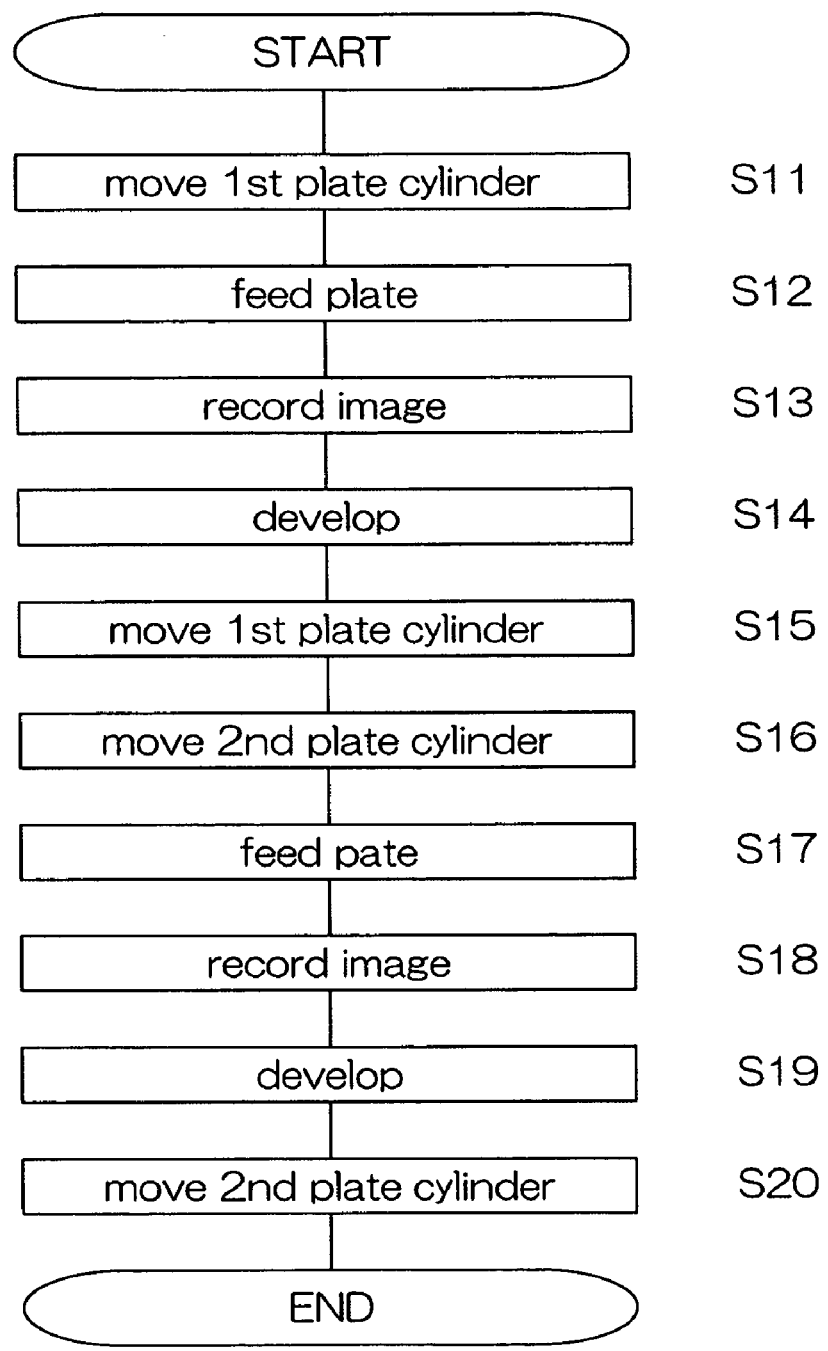
FIG. 9 is a flow chart of a prepress process.

First, the offset press executes a prepress process for recording and developing images on the plates P mounted on the first and second plate cylinders 11 and 12 (step S1). This prepress process follows the steps constituting a subroutine as shown in the flow chart of FIG. 9.

The first plate cylinder 11 is first moved to the image recording position shown in the two-dot chain line in FIG. 1 (step S11).

Next, a plate P is fed to the outer periphery of the first plate cylinder 11 (step S12). To achieve the feeding of the plate P, the pair of clamps, not shown, clamp the forward end of plate P drawn from the supply cassette 63, and the rear end of plate P cut by the cutter 66.

Then, an image is recorded on the plate P mounted peripherally of the first plate cylinder 11 (step S13). For recording the image, the image recorder 25 irradiates the plate P mounted peripherally of the first plate cylinder 11 with a modulated laser beam while the first plate cylinder 11 is rotated at low speed.

Next, the image recorded on the plate P is developed (step S14). The developing step is executed by raising the developing device 26 from the standby position shown in two-dot chain lines to the developing position shown in solid lines in FIG. 1 and thereafter successively moving the developing unit, fixing unit and squeezing unit into contact with the plate P rotating with the first plate cylinder 11.

Upon completion of the developing step, the first plate cylinder 11 is moved to the first printing position shown in the solid line in FIG. 1 (step S15).

Subsequently, the offset press carries out an operation similar to steps S11 to S15 by way of a prepress process for the plate P mounted peripherally of the second plate cylinder 12 (steps S16 to S20). Completion of the prepress steps for the plates P mounted peripherally of the first and second plate cylinders 11 and 12 brings the prepress process to an end.

Referring again to FIG. 8, the prepress process is followed by a printing process for printing the printing paper with the plates P mounted on the first and second plate cylinders 11 and 12 (step S2). This printing process is carried out as follows.

First, each dampening water feeder 21 and each ink feeder 20 are placed in contact with only a corresponding one of the image areas on the plates P mounted on the first and second plate cylinders 11 and 12. Consequently, dampening water and inks are fed to the image areas 67a, 67b, 67c and 67d from the corresponding water feeders 21 and ink feeders 20, respectively. These inks are transferred from the plates P to the corresponding regions of the first and second blanket cylinders 13 and 14, respectively.

Then, the printing paper 100 is fed to the paper feed cylinder 16. The printing paper 100 is subsequently passed from the paper feed cylinder 16 to the impression cylinder 15. The impression cylinder 15 continues to rotate in this state. Since the impression cylinder 15 has half the diameter of the first and second plate cylinders 11 and 12 and the first and second blanket cylinders 13 and 14, the black and cyan inks are transferred to the printing paper wrapped around the impression cylinder 15 in its first rotation, and the magenta and yellow inks in its second rotation.

The forward end of the printing paper printed in the four colors is passed from the impression cylinder 15 to the paper discharge cylinder 17. This printing paper is transported by the pair of chains 19 toward the paper discharge station 28. After image data is obtained from the printing paper by the print reading apparatus 40, the printing paper is discharged to the paper discharge station 28.

The control unit 140 calculates color densities of the printed image and detecting patches from the image data obtained, and controls the feed rates of dampening water and inks based on results of the calculation.

Upon completion of the printing process, the plates P used in the printing are removed (step S3). To remove the plates P, the first plate cylinder 11 is first moved to the image recording position shown in the two-dot chain line in FIG. 1. Then, while the first plate cylinder 11 is rotated counterclockwise, the blade mechanism 73 separates an end of the plate P from the first plate cylinder 11. The plate P separated is guided by the conveyor mechanism 69 into the discharge cassette 68. After returning the first plate cylinder 11 to the first printing position, the second plate cylinder 12 is moved from the second printing position to the image recording position to undergo an operation similar to the above, thereby having the plate P removed from the second plate cylinder 12 for discharge into the discharge cassette 68.

Upon completion of the plate removing step, the first and second blanket cylinders 13 and 14 are cleaned by the blanket cleaning unit 29 (step S4).

After completing the cleaning of the first and second blanket cylinders 13 and 14, the offset press determines whether or not a further image is to be printed (step S5). If a further printing operation is required, the apparatus repeats steps S1 to S4.

If the printing operation is ended, the offset press cleans the inks (step S6). For cleaning the inks, an ink cleaning device, not shown, provided for each ink feeder 20 removes the ink adhering to the ink rollers 71 and ink source 72 of each ink feeder 20.

With completion of the ink cleaning step, the offset press ends the entire process.

[Construction of Illuminating Unit 44]

Figure 10:
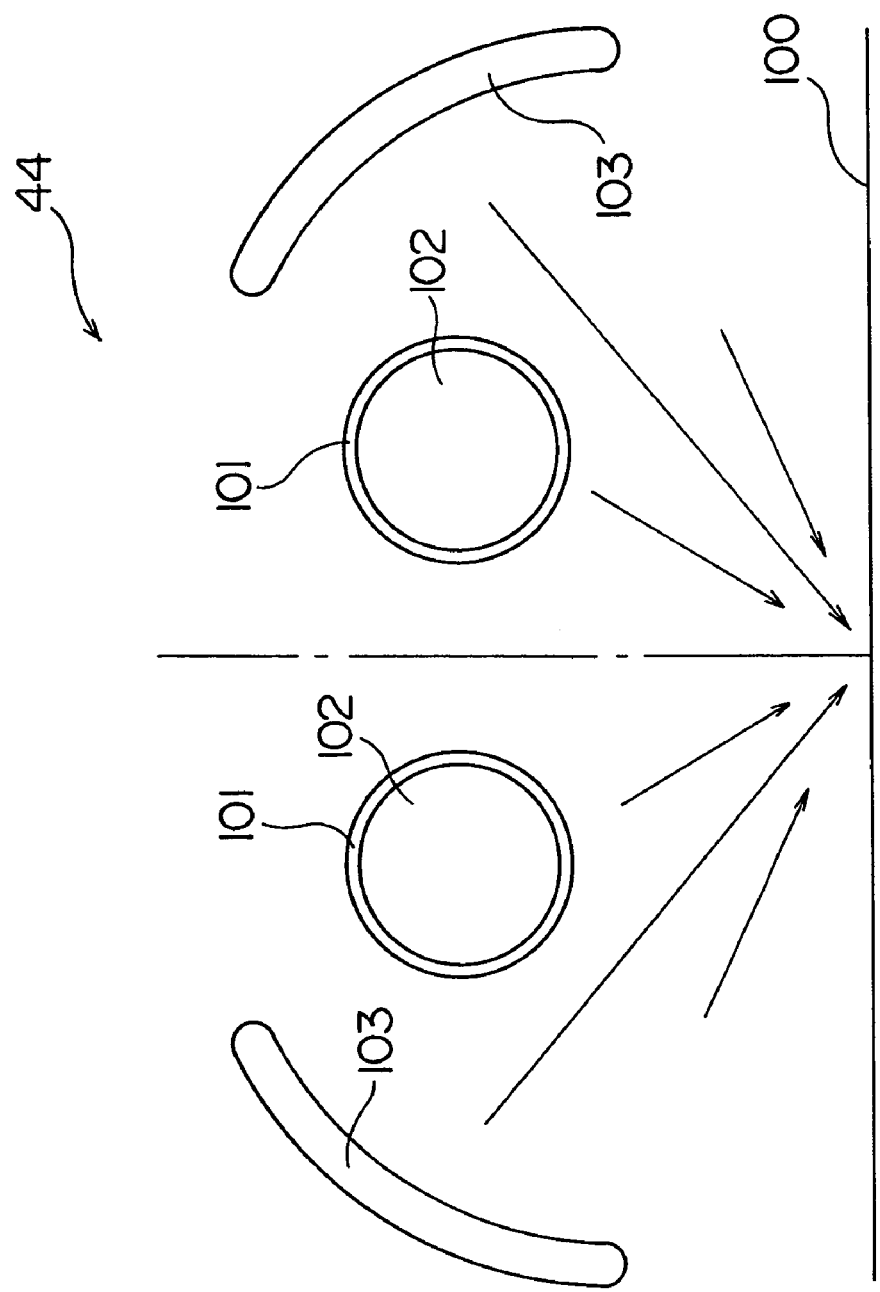
FIG. 10 is an enlarged schematic side view showing a principal portion of an illuminating unit.

The construction of the illuminating unit 44 of the print reading apparatus 40 characterizing this invention will be described next. FIG. 10 is an enlarged schematic side view showing a principal portion of the illuminating unit 44.

The illuminating unit 44 includes a pair of fluorescent lamps 102 with prism sheets 101 mounted peripherally thereof to act as condensing members, and concave mirrors 103 for reflecting light emitted from the fluorescent lamps 102 toward the printing paper 100 acting as a print. The fluorescent lamps 102 used herein are constructed to emit more beams of light toward the concave mirrors 103 than in the other directions. The concave mirrors 103 condense and reflect toward the printing paper 100 the light diverging in directions perpendicular to the axes of the fluorescent lamps 102.

Figure 11:
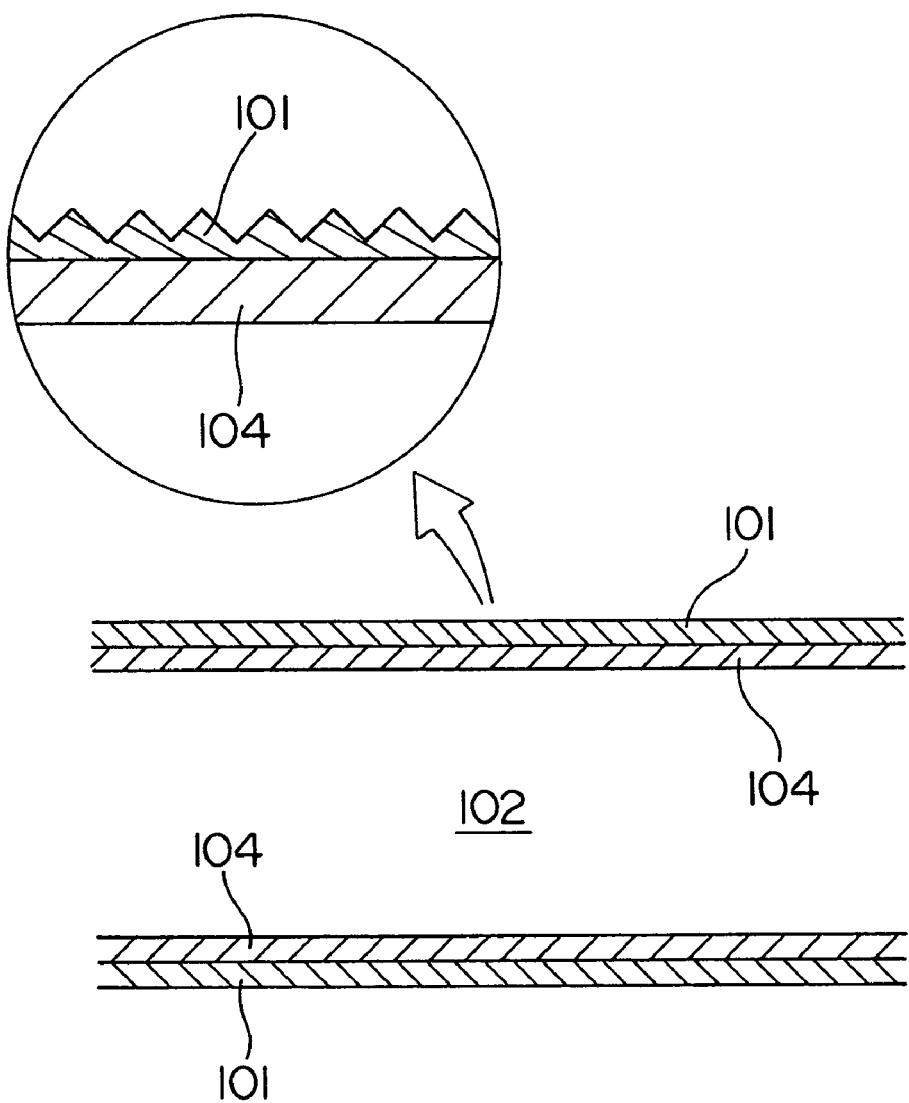
FIG. 11 is a partly enlarged sectional view showing a relationship between an outer tube of a fluorescent lamp and a prism sheet mounted peripherally of the outer tube.
Figure 12:
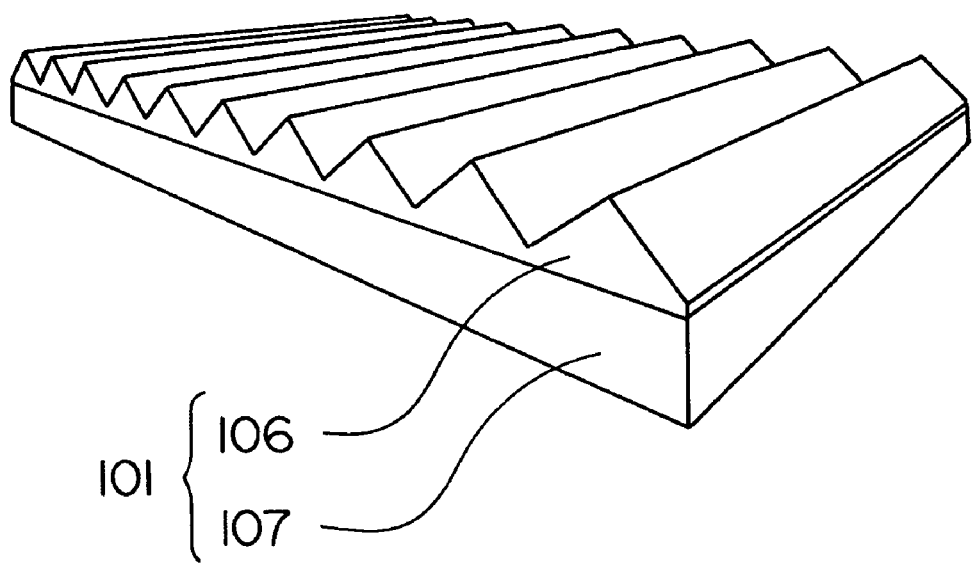
FIG. 12 is an enlarged perspective view of the prism sheet.

FIG. 11 is a partly enlarged sectional view showing a relationship between an outer tube 104 of each fluorescent lamp 102 and the prism sheet 101 mounted peripherally of the outer tube 104. FIG. 12 is an enlarged perspective view of the prism sheet 101.

The prism sheet 101 acts as a condensing member for condensing, in directions perpendicular to the axis of the fluorescent lamp 102, the light diverging axially of the fluorescent lamp 102. The prism sheet 101 has minute projections approximately in the shape of triangular prisms formed on the surface thereof continually along the axis of the fluorescent lamp 102 and projecting in the directions perpendicular to the axis of the fluorescent lamp 102. As shown in FIG. 12, the prism sheet 101 is a laminate of an undulating sheet 106 formed of an acrylic resin and a base sheet 107 formed of polyester film. With this prism sheet 101, diffuse light incident on the base sheet 107 is refracted at surfaces of the projections approximately in the shape of triangular prisms, and emitted from the sheet 106 as condensed in the directions perpendicular to the axis of the fluorescent lamp 102.

Figure 13:
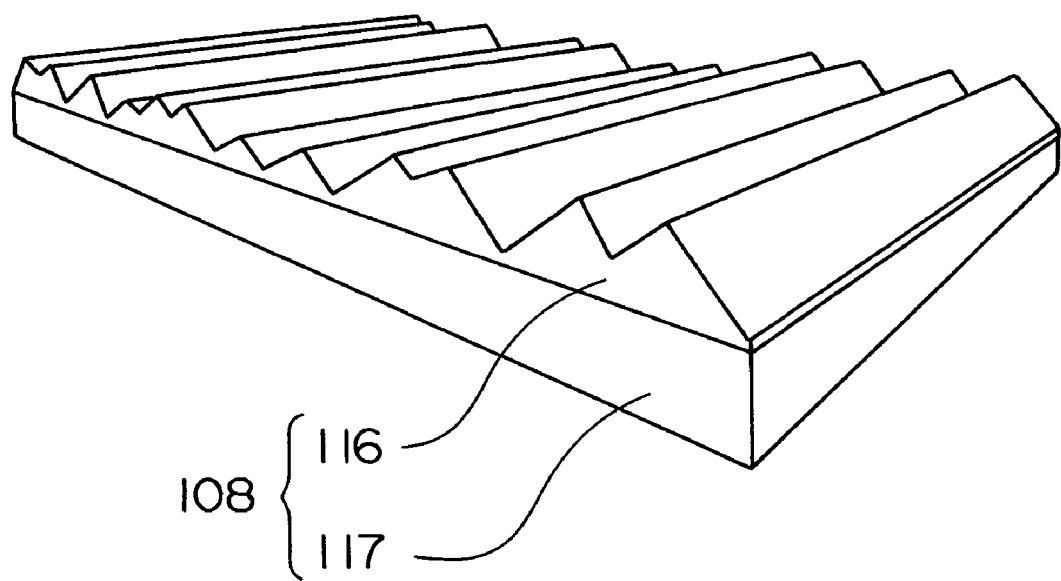
FIG. 13 is an enlarged perspective view of the prism sheet.

FIG. 13 is an enlarged perspective view showing a modified prism sheet 108.

This prism sheet 108 is a laminate of an undulating sheet 116 formed of an acrylic resin and a base sheet 117 formed of polyester film. The prism sheet 101 described above has minute projections approximately in the shape of triangular prisms formed regularly and projecting in the directions perpendicular to the axis of the fluorescent lamp 102. The modified prism sheet 108 has projections approximately in the shape of triangular prisms formed irregularly. With this prism sheet 108 also, diffuse light incident on the base sheet 117 is refracted at the surfaces of the projections approximately in the shape of triangular prisms, and emitted from the sheet 116 as condensed in the directions perpendicular to the axis of the fluorescent lamp 102.

Figure 14:
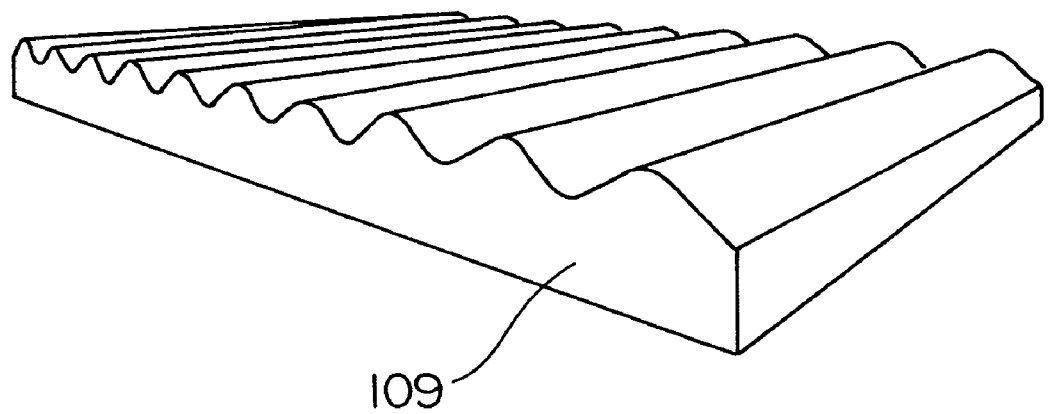
FIG. 14 is an enlarged perspective view of a modified prism sheet.

FIG. 14 is an enlarged perspective view showing a further modified prism sheet 109.

This prism sheet 109 is a single undulating sheet formed of polycarbonate resin. The prism sheets 101 described above has minute projections approximately in the shape of triangular prisms formed regularly and projecting in the directions perpendicular to the axis of the fluorescent lamp 102. In the further modified prism sheet 109, the triangular prisms have rounded tops. With this prism sheet 109 also, incident diffuse light is refracted at the surfaces of the projections approximately in the shape of triangular prisms, and emitted as condensed in the directions perpendicular to the axis of the fluorescent lamp 102.

The above prism sheets 101, 108 and 109 are provided as named "Brightness Enhancement Films (BEF)" by 3M Company, for example.

With the illuminating unit 44 having the above construction, diffuse light emitted from each fluorescent lamp 102 enters the prism sheet 101, 108 or 109, and is refracted at the surfaces of the projections approximately in the shape of triangular prisms. As a result, the light is condensed in the directions perpendicular to the axis of the fluorescent lamp 102 (strictly speaking, to a predetermined angular range in a direction perpendicular to the axis of the fluorescent lamp 102). The light exiting the prism sheet 101, 108 or 109 is, by the action of the concave mirror 103, condensed in the direction parallel to the axis of the fluorescent lamp 102 and directed to the surface of the printing paper 100.

This effectively prevents the phenomenon encountered in the prior art that illuminance is high in a region corresponding to the middle portion longitudinally of the light source, and low in regions corresponding to the opposite ends thereof. Since the light emitted from the fluorescent lamp 102 is condensed in the direction perpendicular to the axis of the fluorescent lamp 102, the printing paper 100 is irradiated with light of increased irradiance. As a result, the print reading apparatus 40 can read images with improved accuracy.

Particularly where the print reading apparatus 40 is disposed inside the printing press, rugged structures and operating devices such as chains present inside the printing press may produce scattered light that adversely influences measurement of end regions of a print. However, this invention prevents scattering of light axially of the fluorescent lamps 102 as much as possible, thereby effectively reducing the influence of scattered light noted above. This invention is particularly useful for the print reading apparatus 40 disposed in the printing press.

Where the fluorescent lamps 102 have a large axial dimension, the prism sheets 101, 108 or 109 may be applied only to positions of the fluorescent lamps 102 corresponding to opposite end regions of a reading range E of the print reading apparatus 40, rather than over the entire peripheral surface areas of the fluorescent lamps 102.

Figure 15:
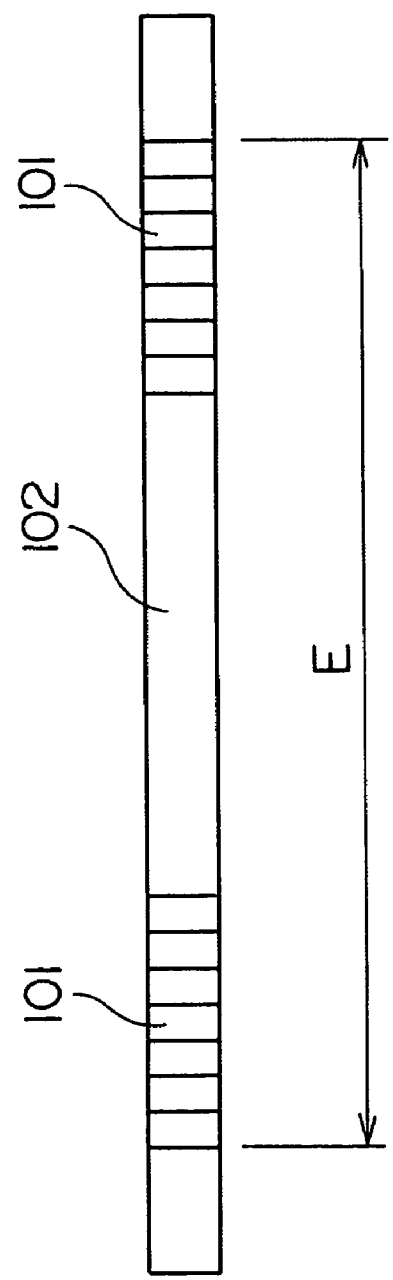
FIG. 15 is a front view showing a positional relationship between the fluorescent lamp and prism sheets.

This point will be discussed hereunder. FIG. 15 is a front view showing a positional relationship between the fluorescent lamp 102 and prism sheets 101. The other, modified prism sheets 108 and 109 are arranged as are the prism sheets 101.

As shown, prism sheets 101 are arranged in positions of the fluorescent lamp 102 corresponding to the opposite end regions of the reading range E of the print reading apparatus 40.

Part of the light incident on the prism sheet 101, 108 or 109 is not transmitted through the prism sheet 101, 108 or 109. Thus, a fixed quantity of light is lost in the prism sheet 101, 108 or 109. Where the fluorescent lamp 102 has a relatively small axial dimension, the above loss of light is outdone by an improvement in condensing efficiency provided by the prism sheet 101, 108 or 109. The prism sheet 101, 108 or 109 may therefore be applied over the entire peripheral surface of the fluorescent lamp 102.

On the other hand, where the fluorescent lamp 102 has a relatively large axial dimension, the prism sheets 101, 108 or 109 may be applied only to positions of the fluorescent lamp 102 corresponding to the opposite end regions of the reading range E of the print reading apparatus 40. This measure is taken by considering the above loss of light, and for the purpose of attaining a balance in illuminance axially of the fluorescent lamp 102 by increasing the illuminance of the light emitted to the printing paper 100 in the positions corresponding to the opposite end regions of the reading range E of the print reading apparatus 40. The dimensions and the like of the prism sheet 101, 108 or 109 may be adjusted according to the length of the fluorescent lamp 102 used.

Figure 16:
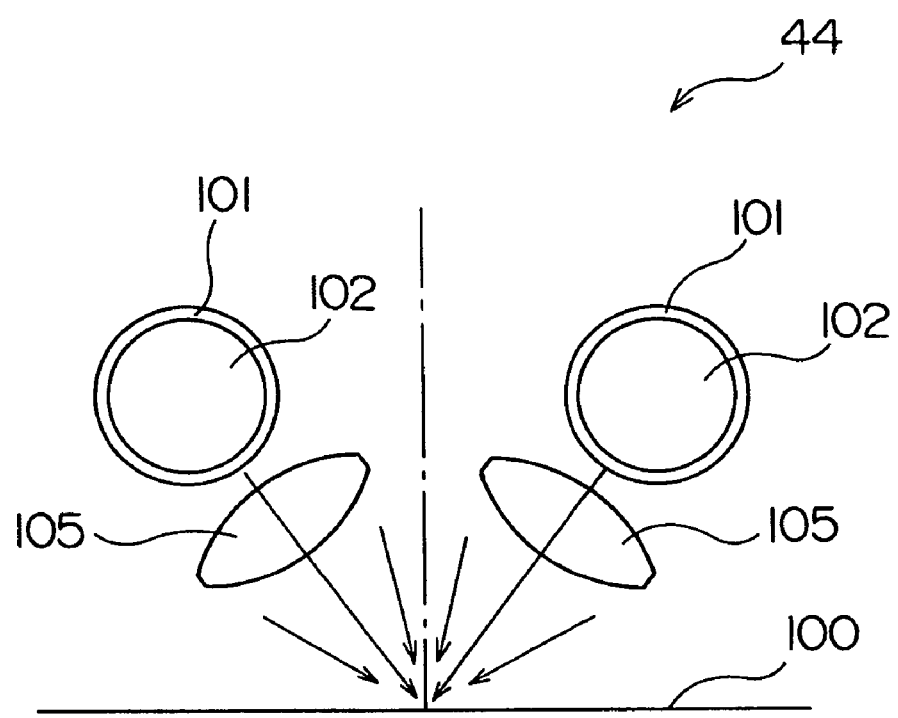
FIG. 16 is an enlarged schematic side view showing a principal portion of an illuminating unit in a different embodiment.

An illuminating unit 44 of the print reading apparatus 40 in a different embodiment will be described next. FIG. 16 is an enlarged schematic side view showing a principal portion of the illuminating unit 44 in the different embodiment. Like reference numerals are used to identify like parts which are the same as in the embodiment shown in FIG. 10 and will not be described again.

In the foregoing embodiment, the pair of concave mirrors 103 condense the light exiting the prism sheets 101, 108 or 109 in the direction parallel to the axes of the fluorescent lamps 102 and direct the light to the surface of printing paper 100. In this embodiment, a pair of cylindrical lenses 105 having power only in the direction parallel to the axes of the fluorescent lamps 102 are used to condense the light exiting the prism sheets 101, 108 or 109 in the direction parallel to the axes of the fluorescent lamps 102.

In the embodiments described above, the print reading apparatus 40 according to this invention is disposed adjacent the paper discharge station 28 of the offset press for reading images from the printing paper 100 having been printed and about to be discharged to the discharge station 28. The discharge station 28 of the offset press has numerous elements obstructive to employment of a complicated optical system. The print reading apparatus 40 according to this invention has a simple construction using the prism sheets 101, 108 or 109. With the tubular fluorescent lamps 102, the apparatus 40 can irradiate the printing paper 100 with high-intensity light uniform axially of the fluorescent lamps 102.

However, this invention is not limited to such a construction, but is applicable also to a print reading apparatus provided independently of a printing press. An illuminating device having a construction similar to the illuminating unit 44 described above may be applied to a scanner other than a print reading apparatus.

In the embodiments described above, the prism sheets 101, 108 or 109 are mounted peripherally of the fluorescent lamps 102. Instead, the prism sheets 101, 108 or 109 may be arranged separately from the fluorescent lamps 102, in positions between the fluorescent lamps 102 and printing paper 100.

In the embodiments described above, the fluorescent lamps 102 are used as tubular light sources. Other tubular light sources such as cold-cathode tubes may be used.

While the tubular light sources are used in the above embodiments, the invention may use any light sources as long as they are elongated and extend in a predetermined direction, e.g. axially thereof. Such "axially extending" light sources include, for example, a plurality of light emitting elements arranged to extend substantially axially thereof.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2003-198870 filed in the Japanese Patent Office on Jul. 18, 2003, the entire disclosure of which is incorporated herein by reference.

What is claimed is:

1. An illuminating device for a scanner, comprising:
   light sources extending axially thereof; and
   condensing members each disposed between one of said light sources and an illuminated object for condensing light diffused axially of said one of said light sources, in directions substantially perpendicular to an axis of said one of said light sources,
   wherein each of said condensing members has minute projections approximately in a shape of triangular prisms formed on a surface thereof continually along the axis of said light source and projecting in directions substantially perpendicular to the axis of one of said light sources.

2. An illuminating device as defined in claim 1, wherein said light sources comprise tubular light sources, and each of said condensing members comprises a resin sheet mounted peripherally of one of said light sources.

3. In a print reading apparatus having an illuminating unit, an image pickup unit, and a moving mechanism for moving a print relative to the illuminating unit and the image pickup unit, for scanning the print with the illuminating unit and the image pickup unit to read an image from the print, said illuminating unit comprising:
   light sources extending axially thereof; and
   condensing members each disposed between one of said light sources and an illuminated object for condensing light diffused axially of said one of said light sources, in directions substantially perpendicular to an axis of said one of said light sources,
   wherein each of said condensing members has minute projections approximately in a shape of triangular prisms formed on a surface thereof continually along the axis of said light source and projecting in directions substantially perpendicular to the axis of one of said light sources.

4. A print reading apparatus as defined in claim 3, wherein said light sources comprise tubular light sources, and each of said condensing members comprises a resin sheet mounted peripherally of one of said light sources.

5. A print reading apparatus as defined in claim 4, wherein said condensing members are arranged in positions of said light sources corresponding to opposite end regions of a reading range of the print reading apparatus.

6. In a print reading apparatus having an illuminating unit, an image pickup unit, and a moving mechanism for moving a print relative to the illuminating unit and the image pickup unit, for scanning the print with the illuminating unit and the image pickup unit to read an image from the print, said illuminating unit comprising:

light sources extending axially thereof; and condensing members each disposed between one of said light sources and an illuminated object for condensing light diffused axially of said one of said light sources, in directions substantially perpendicular to an axis of said one of said light sources, wherein said illuminating unit and said image pickup unit are arranged adjacent a paper discharge station of a printing press, said moving mechanism being a paper discharge mechanism for discharging printed paper to said paper discharge station.

7. A print reading apparatus as defined in claim 6, wherein each of said condensing members has minute projections approximately in a shape of triangular prisms formed on a surface thereof continually along the axis of said light source and projecting in directions substantially perpendicular to the axis of one of said light sources.

* * * * *